US012680866B2

(12) United States Patent
Könning et al.

(10) Patent No.: US 12,680,866 B2
(45) Date of Patent: Jul. 14, 2026

(54) LASER POWER MONITORING WITH LENS SAMPLING DEVICE

(71) Applicant: DILAS Diodenlaser GmbH, Mainz (DE)

(72) Inventors: Tobias Könning, Nackenheim (DE); Henning Fürst, Stadecken-Elsheim (DE); Bernd Köhler, Saulheim (DE)

(73) Assignee: DILAS Diodenlaser GmbH, Mainz (DE)

( * ) Notice: Subject to any disclaimer, the term of this patent is extended or adjusted under 35 U.S.C. 154(b) by 117 days.

(21) Appl. No.: 18/763,216

(22) Filed: Jul. 3, 2024

(65) Prior Publication Data

US 2026/0009675 A1     Jan. 8, 2026

(51) Int. Cl.
*G01J 1/42*          (2006.01)
*G01J 1/04*          (2006.01)
*H01S 3/00*          (2006.01)

(52) U.S. Cl.
CPC ........... *G01J 1/4257* (2013.01); *G01J 1/0411* (2013.01); *G01J 1/0414* (2013.01); *H01S 3/0014* (2013.01)

(58) Field of Classification Search
CPC ...... G01J 1/4257; G01J 1/0411; G01J 1/0414; H01S 3/0014
See application file for complete search history.

(56) References Cited

U.S. PATENT DOCUMENTS

| | | | | |
|---|---|---|---|---|
| 5,136,152 A | * | 8/1992 | Lee | G11B 7/1353 |
| | | | | 369/112.28 |
| 5,828,045 A | | 10/1998 | Brömse | |
| 6,078,601 A | * | 6/2000 | Smith | H01S 5/06835 |
| | | | | 372/29.014 |
| 6,483,864 B1 | | 11/2002 | Yuang et al. | |

(Continued)

FOREIGN PATENT DOCUMENTS

| | | |
|---|---|---|
| DE | 10240574 A1 | 4/2003 |
| JP | H02-165684 A | 6/1990 |

(Continued)

OTHER PUBLICATIONS

International Search Report and Written Opinion received for International Patent Application No. PCT/EP2025/068634 mailed on Sep. 24, 2025, 18 pages.

*Primary Examiner* — Michelle M Iacoletti
*Assistant Examiner* — Mohamed Doumbia
(74) *Attorney, Agent, or Firm* — TraskBritt

(57)          ABSTRACT

A laser apparatus with power monitoring includes a laser source to generate a laser beam, a photodetector to monitor a power of the laser beam, and a transmissive, lens-based sampling device positioned in a beam path of the laser beam. The sampling device includes a partially reflective curved surface generate and focus a partial reflection of the laser beam. The partially reflective curved surface is oriented to direct the partial reflection toward the photodetector. Integration of beam-extraction and focusing functionalities into a single optical element reduces the overall size and com- (Continued)

plexity of the power monitoring system. The lens-based sampling device may have little or no optical power for the transmitted laser beam, such that the lens-based sampling device can be implemented in an existing laser apparatus without need for further alteration of the optical configuration of the laser apparatus.

22 Claims, 2 Drawing Sheets

(56)                           References Cited

U.S. PATENT DOCUMENTS

| | | |
|---|---|---|
| 8,028,918 B2 | 10/2011 | Zhang et al. |
| 11,867,955 B2 | 1/2024 | Wang et al. |
| 2003/0002547 A1* | 1/2003 | Lee ........................ H01S 5/0683 |
| | | 372/29.02 |
| 2005/0180471 A1* | 8/2005 | Chen .................. G02B 17/0856 |
| | | 372/101 |

FOREIGN PATENT DOCUMENTS

| | | |
|---|---|---|
| JP | 2003060299 A | 2/2003 |
| WO | WO-200111331 A1 | 2/2001 |

* cited by examiner

LASER POWER MONITORING WITH LENS SAMPLING DEVICE

TECHNICAL FIELD OF THE INVENTION

The present invention relates in general to monitoring the power of a laser beam. The present invention relates in particular to compact solutions for sampling the laser beam to measure its power.

DISCUSSION OF BACKGROUND ART

Many laser apparatuses incorporate a laser power monitoring system. For example, power monitoring is commonly implemented in a feedback loop to stabilize the power of a laser beam. Power stabilization is critical in some laser-based medical procedures, such as eye-surgery, and is used in a variety of laser manufacturing processes as well. Scientific applications often require particularly accurate laser power stabilization. Laser power monitoring is also useful as a safety precaution, especially within the context of high-power beams. Power monitoring may be used to automatically turn off a laser source, or block a laser beam, in case the laser power exceeds or falls below an acceptable level.

Several schemes exist for monitoring the power of a laser beam. Each of these prior-art schemes has its own advantages and disadvantages. The preferred choice of method depends on the specific requirements of the laser/laser apparatus, e.g., the desired power monitoring accuracy, the potential impact on the laser beam, and the complexity and cost of the implementation.

One prior-art method involves detecting stray light from one or more optical elements in the laser beam path. This method has the significant advantage of simple implementation as well as being non-intrusive in the sense that no alteration of the laser system and beam path is required. However, there are disadvantages to this method that may render the method insufficient in some situations. The measured stray light power is sensitive to other factors than the actual beam power and may therefore lack reliability. For example, changes in the measured stray-light power may be a result of misalignment and/or other spatial beam drift rather than a change in actual beam power.

Another conventional technique places a photodetector behind a highly reflective mirror in the beam path to detect laser light leaked through the mirror. It is common that a laser source or apparatus, for reasons unrelated to power monitoring, is configured with one or more folding mirrors suitable for this purpose. A lens is used to focus the leaked laser light on the photodetector. This technique usually provides a more accurate and reliable assessment of the power of the main laser beam than stray-light based schemes. However, the leaked laser power is often highly polarization-dependent, and the power measurement is therefore sensitive to polarization changes.

A third and widely used approach employs a pickoff mirror. The pickoff mirror is a highly reflective mirror situated on the edge of the laser beam to divert a portion of the laser beam toward a photodetector. A lens focuses the diverted laser light on the photodetector. The pickoff mirror may, however, introduce undesirable changes in the characteristics of the main laser beam, and the power measurement may be sensitive to small spatial drift of the laser beam. A more accurate, more reliable, and less intrusive measurement may be obtained when the pickoff mirror is a low-reflectivity mirror that intersects the entire laser beam.

SUMMARY OF THE INVENTION

Power monitoring using the leakage-light and pickoff-mirror methods discussed above generally outperforms stray-light-based power monitoring techniques in terms of reliability and accuracy. However, the leakage-light and pickoff-mirror methods both have drawbacks. For example, as discussed above, the leakage-light method becomes inaccurate in the presence of polarization changes, and the pickoff-mirror method is sensitive to beam drift. The accuracy of the pickoff-mirror method can be improved by replacing the pickoff mirror with a high-transmission sampling mirror that spans across the full transverse area of the laser beam. Accuracy-related issues aside, each of the leakage-light, pickoff-mirror, and sampling-mirror methods require fitting a focusing lens in front of the photodetector, which may be difficult in situations subject to tight spatial constraints. The leakage-light method further relies on a folding mirror in the path of the main laser beam. In laser apparatuses without a suitable folding mirror, a redesign of the optical configuration is needed to implement the leakage-light method.

The present disclosure introduces a laser power monitoring system that utilizes a lens-based sampling device to sample a laser beam for power measurement. This power monitoring system solves many of the problems afflicting other power monitoring techniques and is capable of reliable and accurate power monitoring performance. The present power monitoring system leverages a partially reflective curved surface to extract a portion of a laser beam and directly focus the extracted beam portion onto a photodetector. The main laser beam is transmitted by the lens-based sampling device. By integrating beam-extraction and focusing functionalities into a single optical element situated in the main beam path, the overall size and complexity of the power monitoring system are reduced, making it particularly suitable for applications where space is at a premium and simplicity is desired. In certain embodiments, the lens-based sampling device is designed to have little or no optical power for the transmitted laser beam, such that the lens-based sampling device can be implemented in an existing laser apparatus without need for further alteration of the optical configuration of the laser apparatus. In other embodiments, an adjacent focusing element, downstream of the lens-based sampling device, may compensate for any optical power imposed by the lens-based sampling device on the transmitted laser beam.

In one aspect of the invention, a laser apparatus with power monitoring includes a laser source to generate a laser beam, a photodetector to monitor a power of the laser beam, and a transmissive sampling device including one or more lenses positioned in a beam path of the laser beam. The one or more lenses include a partially reflective surface to generate and focus a partial reflection of the laser beam. The partially reflective surface includes either (a) a concave surface facing the laser beam as incident on the transmissive sampling device or (b) a convex surface facing away from the laser beam as incident on the transmissive sampling device. The partially reflective surface is oriented to direct the partial reflection away from the beam path and onto a propagation path to the photodetector. A net-optical power imposed on the laser beam from transmission along the beam path through the one or more lenses is less than 10 diopters in magnitude.

In another aspect of the invention, a laser apparatus with power monitoring includes a laser source to generate a laser beam, a photodetector to monitor a power of the laser beam, and a transmissive sampling device including one or more lenses positioned in a beam path of the laser beam. The one or more lenses include a partially reflective surface to generate and focus a partial reflection of the laser beam. The partially reflective surface is either (a) a concave surface facing the laser beam as incident on the transmissive sampling device or (b) a convex surface facing away from the laser beam as incident on the transmissive sampling device. The partially reflective surface is oriented to direct the partial reflection away from the beam path and onto a propagation path to the photodetector. The one or more lenses impose a non-zero net-optical power on the laser beam transmitted along the beam path. The non-zero net-optical power is at least 10 diopters in magnitude. The laser apparatus further includes a focusing element disposed in the beam path after, and adjacent, the transmissive sampling device to modify focusing properties of the laser beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figures 1, 2, 3:
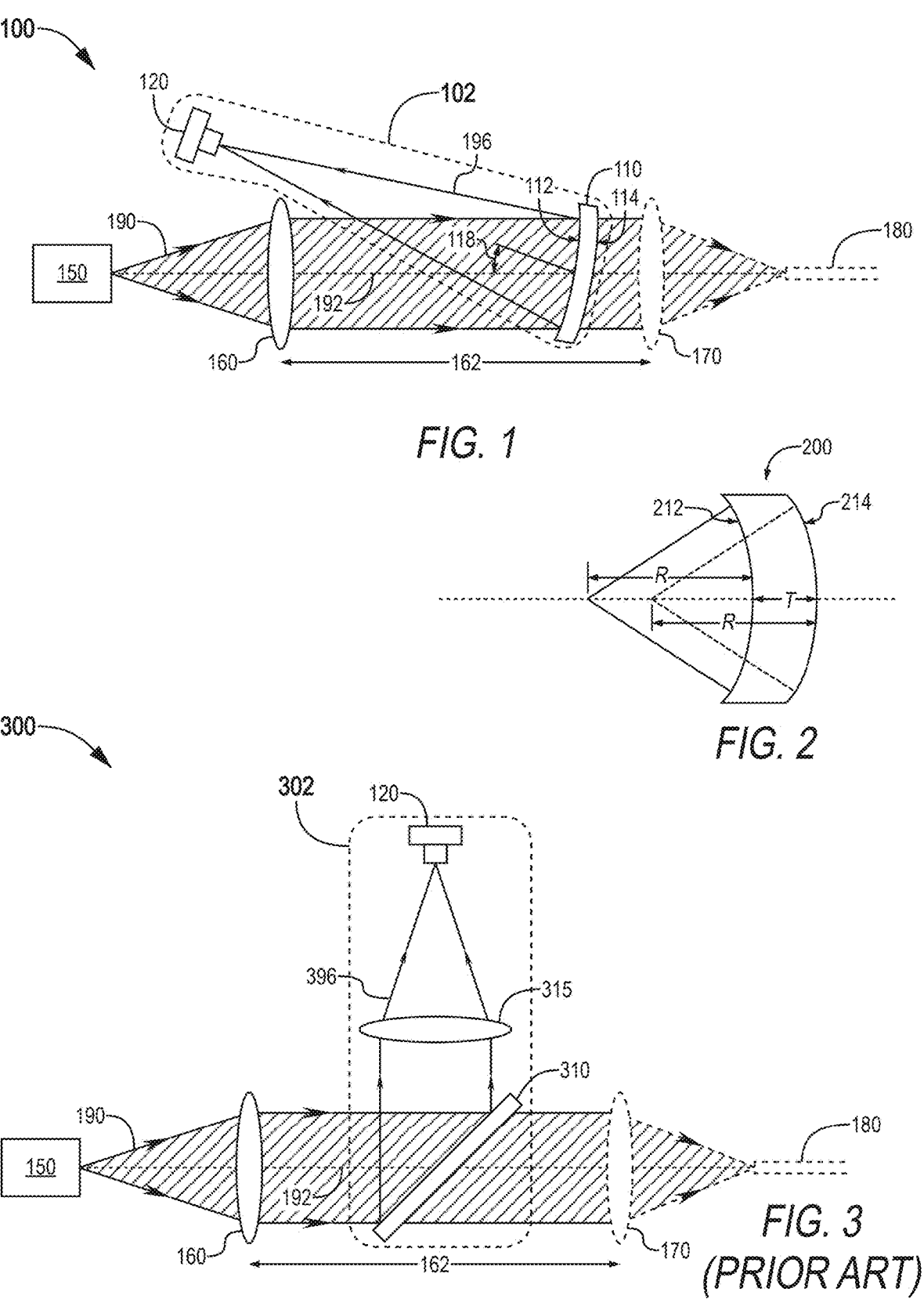
FIG. 1 illustrates a laser apparatus equipped with a power monitoring system that utilizes a transmissive sampling device in the form of a concave-convex lens, according to an embodiment.
FIG. 2 illustrates a spherical concave-convex lens with equally curved concave and convex surfaces. This lens is an example of the concave-convex lens of the FIG. 1 power monitoring system.
FIG. 3 illustrates a prior-art laser apparatus equipped with a sampling-mirror-based power monitoring system.

Referring now to the drawings, wherein like components are designated by like numerals, FIG. 1 illustrates one laser apparatus 100 equipped with a power monitoring system 102 that utilizes a transmissive sampling device in the form of a concave-convex lens 110. Herein, a "concave-convex" lens is a lens that includes a concave surface and a convex surface. Examples of concave-convex lenses include convexo-concave and concavo-convex lenses. Laser apparatus 100 includes a laser source 150 that generates a laser beam 190. Power monitoring system 102 is configured to monitor the power of laser beam 190 by measuring the power of a fraction of laser beam 190 extracted by concave-convex lens 110. Concave-convex lens 110 both extracts and focuses a fraction of laser beam 190 for power measurement, while transmitting most of the power of laser beam 190 with only little or no impact on the focusing properties of the transmitted laser beam.

Power monitoring system 102 includes concave-convex lens 110 and a photodetector 120. Concave-convex lens 110 is positioned in a collimated section 162 of the beam path 192 of laser beam 190. Concave-convex lens 110 is mostly transmissive, for example with a transmission coefficient of at least 90% or, more preferably, at least 95%. However, a concave surface 112 of concave-convex lens 110, facing the incident laser beam, is partially reflective and thus generates a partial reflection 196. In one example, the reflection coefficient for concave surface 112 is in the range between 0.01 and 5%. In one embodiment, concave surface 112 is an uncoated surface of concave-convex lens 110. In another embodiment, concave surface 112 includes a partially reflective coating. The convex surface 114 of concave-convex lens 110 may include an antireflective coating to otherwise optimize transmission of laser beam 190 through concave-convex lens 110. Concave-convex lens 110 is oriented such that concave surface 112 directs partial reflection 196 away from beam path 192 and in the direction toward photodetector 120. Concave surface 112 also focuses partial reflection 196. Photodetector 120 may be positioned at or near the focus of partial reflection 196 for optimal detection of partial reflection 196. Photodetector 120 measures the power of partial reflection 196 or obtains data corresponding to the power of partial reflection 196, thereby providing a measure of the power of laser beam 190. The power of partial reflection 196 may be proportional to the power of laser beam 190. Photodetector 120 is, for example, a photodiode, a photoresistor, a pyroelectric sensor, or another detector sensitive to laser light.

Concave surface 112 and convex surface 114 span the full transverse area of laser beam 190, and concave surface 112 partially reflects the full transverse area of laser beam 190. This eliminates or at least reduces the sensitivity of the power measurement provided by power monitoring system 102 to spatial drift of laser beam 190. Without departing from the scope hereof, a low-power tail of the transverse intensity distribution of laser beam 190 may extend outside concave-convex lens 110. For example, concave-convex lens 110 may be sized to span at least the $1/e^2$ transverse area of laser beam 190.

Concave-convex lens 110 imposes little or no net-optical power on the transmitted laser beam. Thus, the transmitted portion of laser beam 190 is substantially collimated when propagating away from concave-convex lens 110 despite being defocused by concave surface 112 and focused by convex surface 114. In one embodiment, the net-optical power imposed on the transmitted portion of laser beam 190 is less than 10 diopters in magnitude, or even zero. An optical power of less than 10 diopters in magnitude will have negligible effect in many scenarios, especially in relatively compact laser apparatuses with short propagation distances. In scenarios more sensitive to changes in the focusing properties of the transmitted portion of laser beam 190, the net-optical power imposed on the transmitted laser beam may be less than 1 diopter. In one example, concave-convex lens 110 imposes a net-optical power on the transmitted laser beam of no more than 0.1 diopters.

FIG. 2 illustrates one spherical concave-convex lens 200 with equally curved concave and convex surfaces. Concave-convex lens 200 is an embodiment of concave-convex lens 110. The use of spherical lens surfaces makes concave-convex lens 200 relatively simple and affordable to manufacture. Concave surface 212 and convex surface 214 of concave-convex lens 200 have the same radius of curvature R and are distanced from each other by lens-thickness T. The focal length of concave-convex lens 200 in transmission is $f=6R^2/T$. In one example, R is at least 80 millimeters (mm), and T is at most 10 mm. This example of concave-convex lens 200 has a focal length greater than 3840 mm, corresponding to an optical power of no more than 4.2 diopters. In scenarios that require a smaller optical power, concave-convex lens 200 may be thinner, or its surfaces may be less strongly curved. The radius of curvature of concave surface 212 impacts the optimal distance to photodetector 120 in power monitoring system 102. A radius of curvature of 80 mm of concave surface 212 corresponds to the focus of partial reflection 196 being a distance of 40 mm away from concave surface 212, which is acceptable in many scenarios. If a shorter or longer focal distance is needed, radius of curvature R of surfaces 212 and 214 and/or lens-thickness T may be modified accordingly.

Referring again to FIG. 1, a variety of designs of concave-convex lens 110 are possible in addition to that of spherical concave-convex lens 200. For example, concave surface 112 and convex surface 114 may be spherical but have at least slightly different radii of curvature. By using aspheric lens surfaces, it is even possible to achieve a net-zero optical power for the transmitted laser beam. In other words, concave-convex lens 110 may be afocal. In one such example, concave surface 112 and convex surface 114 are elliptical surfaces characterized by the same radius of curvature Re and eccentricity e. When the eccentricity e equals 1/n, where n is the refractive index of concave-convex lens 110, the net-optical power of concave-convex lens 110 is zero, and laser beam 190 is transmitted with no magnification.

Since concave-convex lens 110 imposes little or no optical power on the transmitted laser beam, concave-convex lens 110 may be inserted into an existing beam path with little or no effect on the downstream beam properties. This provides for simple integration of power monitoring system 102 into an existing laser-apparatus design, such as that depicted in FIG. 1 for laser apparatus 100. As shown, laser apparatus 100 may further include a focusing lens 170 that focuses laser beam 190, for example to couple laser beam 190 into an optical fiber 180. Since concave-convex lens 110 imposes little or no optical power on the transmitted laser beam, concave-convex lens 110 may be implemented in beam path 192 without adversely affecting this focusing of laser beam 190 and, e.g., without adversely affecting the coupling of laser beam 190 into optical fiber 180.

The optical configuration of laser apparatus 100, disregarding power monitoring system 102, is only one example of laser apparatuses compatible with power monitoring system 102. More generally, power monitoring system 102 may be integrated into a laser apparatus with a collimated beam section of sufficient length to accommodate concave-convex lens 110 while providing an interference-free pathway for partial reflection 196 away from beam path 192.

Integration of power monitoring system 102 into a laser apparatus is further simplified by the fact that power monitoring system 102 only requires two elements, namely concave-convex lens 110 and photodetector 120. The lack of need for a separate focusing element between concave-convex lens 110 and photodetector 120 also allows for a relatively compact solution. In some scenarios, power monitoring system 102 may be integrated in an existing laser-apparatus design without adding to the footprint of this design. In another scenario, such as that depicted in FIG. 1, photodetector 120 and the path of partial reflection 196 add to the footprint. However, power monitoring system 102 still offers a compact solution relative to other power monitoring techniques capable of reliable and accurate power monitoring.

FIG. 3 illustrates a laser apparatus 300 equipped with a prior-art sampling-mirror-based power monitoring system 302. Laser apparatus 300 is similar to laser apparatus 100, with the exception that power monitoring system 102 is replaced by power monitoring system 302. Power monitoring system 302 uses a mostly transmissive, but partially reflective sampling mirror 310 to sample laser beam 190. Sampling mirror 310 directs a partial reflection 396 of laser beam 190 away from beam path 192 in the direction toward photodetector 120. However, because sampling mirror 310 lacks curvature, a separate focusing lens 315 is required to focus partial reflection 196 on photodetector 120. This leads to a less compact footprint than when sampling laser beam 190 with concave-convex lens 110, as depicted in FIG. 1. The presence of focusing lens 315 in power monitoring system 302, as well as the need for the initially collimated partial reflection 396 to clear collimation lens 160, prevents extraction of partial reflection 396 at a shallow angle relative to beam path 192. Referring again to FIG. 1, the fact that concave-convex lens 110 focuses partial reflection 196 in power monitoring system 102, allows for directing extracting partial reflection 196 along a path that is at a shallower angle relative to beam path 192. Angle 118, indicated in FIG. 1, may be less than 45 degrees.

In the embodiment depicted in FIG. 1, the propagation path of partial reflection 196 from concave surface 112 to photodetector 120 is straight. In an alternative embodiment, this propagation path includes one or more folding mirrors, for example if deemed necessary by other spatial constraints. Most often, though, the simplest and most compact solution is achieved with a straight propagation path of partial reflection 196.

While retaining the benefits of laser apparatus 100 discussed above, partial reflection 196 may be generated by convex surface 114 facing away from the incident laser beam 190 instead of being generated by concave surface 112 facing the incident laser beam 190. In such a modification of laser apparatus 100 and power monitoring system 102, convex surface 114 is partially reflective, and laser beam 190 passes through concave surface 112 before being partially reflected by convex surface 114. Convex surface 114 may be uncoated or include a partially reflective coating to generate partial reflection 196. In another modification, each of convex surface 114 and concave surface 112 contribute to partial reflection 196, although this may prevent partial reflection 196 from coming to a single, well-defined focus.

Figure 4:
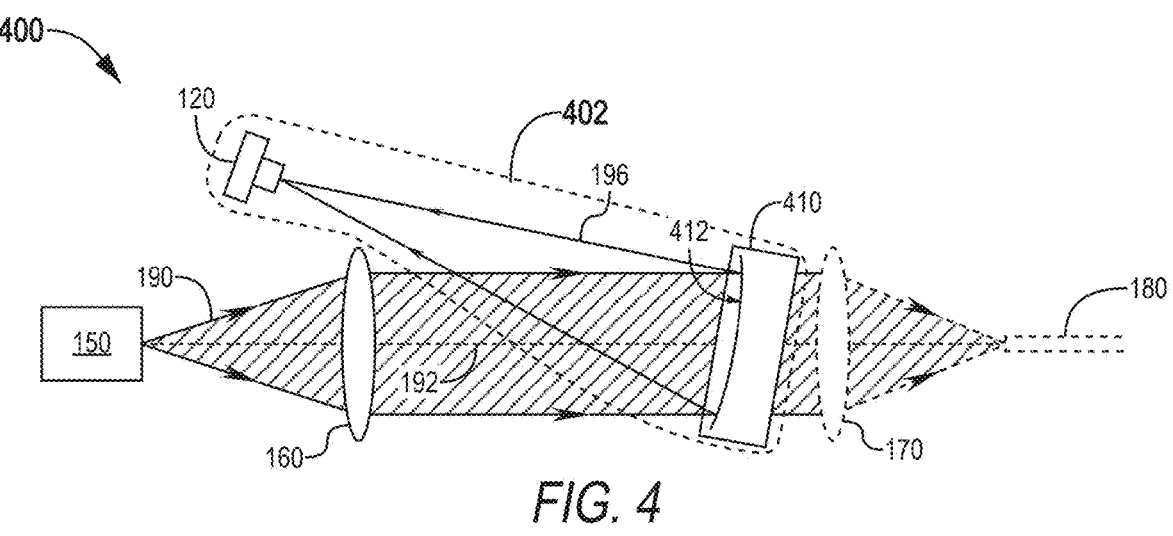
FIG. 4 illustrates a laser apparatus equipped with a power monitoring system that utilizes a transmissive, lens-based sampling device, according to an embodiment. This lens-based sampling device may include one or more lenses.

FIG. 4 illustrates one laser apparatus 400 equipped with a power monitoring system 402 that utilizes a transmissive, lens-based sampling device 410. Laser apparatus 400 is similar to laser apparatus 100 except for implementing power monitoring system 402 instead of power monitoring system 102. Power monitoring system 402 is a generalization of power monitoring system 102 that replaces concave-convex lens 110 with a more general lens-based sampling device 410. Sampling device 410 is schematically depicted in FIG. 4 and contains one or more lenses, including a lens that forms a partially reflective curved surface 412 that generates partial reflection 196. In one embodiment, partially reflective surface 412 is a concave surface facing the incident laser beam 190, such as concave surface 112. In another embodiment, partially reflective surface 412 is a convex surface facing away from the incident laser beam 190, such as a partially reflective version of convex surface 114.

Sampling device 410 imposes little or no net-optical power on the transmitted portion of laser beam 190. Yet, the optical power imposed by individual lenses of sampling device 410 may be significant. For example, in an embodiment of sampling device 410 that includes a plurality of lenses, one of these lenses may significantly focus or defocus the transmitted portion of laser beam 190, while one or more other lenses of sampling device 410 at least mostly compensates for this focusing. The net-optical power imposed by sampling device 410 on the transmitted laser beam may be zero or have a non-zero magnitude of less than 10 diopters, 1 diopter, or 0.1 diopters, as discussed above in reference to FIG. 1.

In certain embodiments, partially reflective surface 412 is the first lens surface of sampling device 410, such that partially reflective surface 412 is the lens surface that receives laser beam 190 from outside sampling device 410. This configuration may be advantageous because it allows partial reflection 196 to leave sampling device 410 without having to pass through any other lens surfaces thereof. Partially reflective surface 412 may be an uncoated lens surface, in which case partial reflection 196 is a simple Fresnel reflection. All other lens surfaces of sampling device 410 may include an antireflective coating.

In a manner similar to that discussed above for concave-convex lens 110 and concave surface 112 in reference to FIG. 1, all lenses of sampling device 410 span the full transverse area of laser beam 190, and partially reflective surface 412 partially reflects the full transverse area of laser beam 190. A low-power tail of the transverse intensity distribution of laser beam 190 may extend beyond one or more lens surfaces of sampling device 410, as also discussed above for concave-convex lens 110 and concave surface 112.

Figure 5:
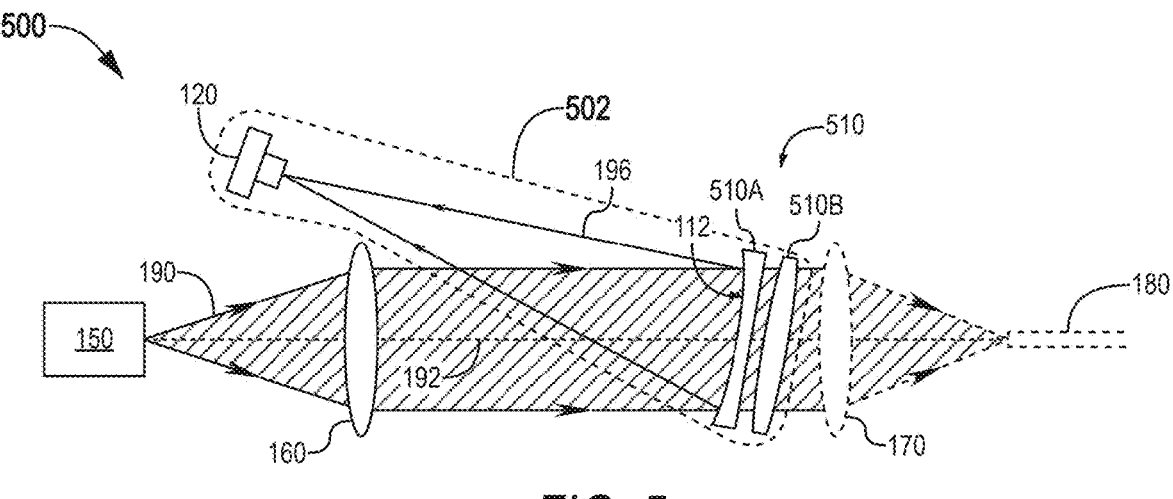
FIG. 5 illustrates a laser apparatus equipped with a power monitoring system that utilizes a transmissive, dual-lens sampling device, according to an embodiment.

FIG. 5 illustrates one laser apparatus 500 equipped with a power monitoring system 502 that utilizes a transmissive dual-lens sampling device. Laser apparatus 500 is an embodiment of laser apparatus 400 that implements sampling device 410 as a dual-lens sampling device 510 containing two lenses 510A and 510B. Lens 510A forms concave surface 112. Each of lenses 510A and 510B imposes a non-zero optical power on the transmitted portion of laser beam 190. However, the optical power of lens 510B substantially compensates for the optical power of lens 510A, such that sampling device 510 imposes little or no net-optical power on the transmitted laser beam. For example, the optical powers of lenses 510A and 510B may cooperate to produce a net-optical power of zero or have a non-zero magnitude of less than 10 diopters, 1 diopter, or 0.1 diopters, as discussed above in reference to FIG. 1.

In the depicted example, lens 510A is a plano-concave lens, and lens 510B is a biconvex lens. Other configurations are possible. In one generalization of the depicted example, lens 510A is a negative lens for the transmitted laser beam, and lens 510B is a positive lens for the transmitted laser beam. Examples of such a negative lens include a plano-concave lens, a biconcave lens, and a convexo-concave lens. Examples of the positive lens include a biconvex lens, a plano-convex lens, and a concavo-convex lens. Furthermore, lenses 510A and 510B may have non-parallel optical axes.

While each of power monitoring systems 102, 402, and 502 samples a collimated laser beam, it is, at least under some circumstances, feasible to implement the sampling device of these power monitoring systems in a diverging or converging laser beam. Such implementation of concave-convex lens 110, lens-based sampling device 410, and dual-lens sampling device 510 may require a more or less strongly curved partially reflective surface than when the laser beam is collimated.

Figure 6:
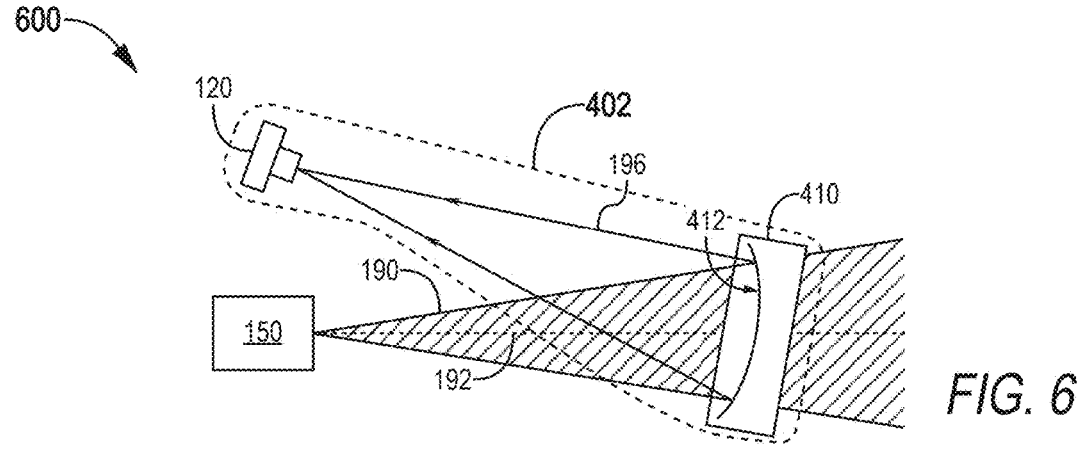
FIG. 6 illustrates a laser apparatus equipped with a power monitoring system that utilizes a transmissive, lens-based sampling device to sample a diverging laser beam, according to an embodiment.

FIG. 6 illustrates one laser apparatus 600 equipped with a power monitoring system that utilizes a transmissive, lens-based sampling device to sample a diverging laser beam. Laser apparatus 600 is a modification of laser apparatus 400, wherein sampling device 410 is situated in a section of beam path 192 where laser beam 190 is diverging. For simplicity, FIG. 6 does not show optical elements downstream of sampling device 410, such as a collimation lens. It may be necessary to increase the curvature of partially reflective surface 412 in laser apparatus 600, as compared to in laser apparatus 400, to compensate for the divergence of laser beam 190.

Sampling device 410 may also be used to sample a converging laser beam, for example when the convergence of the laser beam is sufficiently slow that partially reflective surface 412 can focus partial reflection 196 at a reasonable distance from sampling device 410. If the convergence is fast, partially reflective surface 412 may be replaced by a convex surface facing the incident laser beam 190 or a concave surface facing away from the incident laser beam 190 in order to locate the focus of a partial reflection at photodetector 120. Other optics within sampling device 410 would then be modified accordingly.

As discussed above, the sampling device that samples laser beam 190 in each of power monitoring systems 102, 402, and 502 imposes little or no optical power on the transmitted portion of laser beam 190. Specifically, each of concave-convex lens 110, lens-based sampling device 410, and dual-lens sampling device 510 imposes little or no net-optical power on the transmitted laser beam. In certain scenarios, these sampling devices may be modified to impose significant net-optical power on the transmitted portion of laser beam 190, while performing as described with respect to partial reflection 196. Such modifications lack the advantage of being insertable into an existing laser apparatus without affecting the downstream focusing properties of the transmitted laser beam. However, the laser apparatus may include a focusing element, adjacent to and downstream of the sampling device, that can compensate for the net-optical power imposed by the sampling device. This focusing element may be a lens or a mirror.

For example, referring now to FIG. 1 and embodiments of laser apparatus 100 that include focusing lens 170, concave-convex lens 110 may be modified to impose a non-zero net-optical power on the transmitted portion of laser beam 190. This net-optical power may be 10 diopters or more. With this modified version of concave-convex lens 110, focusing lens 170 may be configured to compensate for the optical power imposed by the modified concave-convex lens 110 so as to still focus laser beam 190 at the intended location. Such compensation may entail choosing a different optical power for focusing lens 170 than would be suitable in the absence of the non-zero net-optical-power version of concave-convex lens 110 in the beam path. In another example, the modified concave-convex lens 110 with significant non-zero net-optical power is positioned in a collimated beam section and accompanied by an adjacent, downstream focusing lens that re-collimates the transmitted laser beam.

More generally, consider the situation where one of power monitoring systems 102, 402, or 502, modified to utilize a sampling device with significant non-zero net-optical power, is to be implemented into an existing laser apparatus design. If the sampling device can be positioned immediately adjacent to an existing focusing element, this focusing element can be replaced by another focusing element with a different optical power to compensate for the non-zero net-optical power imposed by the sampling device. This focusing element may be downstream or upstream of the sampling device. If the laser apparatus lacks such a focusing element, the sampling device may be accompanied by an adjacent focusing element that compensates for the optical power imposed on the transmitted laser beam by the sampling device.

Each of the power monitoring systems discussed above may be implemented to sample not the full transverse area but only a portion of a laser beam. In other words, each of concave-convex lens 110, lens-based sampling device 410, and dual-lens sampling device 510 may intercept only part of the transverse area of laser beam 190, e.g., only an edge of the laser beam. The power measurement obtained with such partial sampling may be less reliable, and the effect on the transmitted laser beam may or may not be acceptable. However, the advantages associated with performing sampling and focusing with a single sampling device remain.

The present invention is described above in terms of a preferred embodiment and other embodiments. The invention is not limited, however, to the embodiments described and depicted herein. Rather, the invention is limited only by the claims appended hereto.

What is claimed is:

1. A laser apparatus with power monitoring, comprising:
a laser source to generate a laser beam;
a photodetector to monitor a power of the laser beam; and
a transmissive sampling device including one or more lenses positioned in a beam path of the laser beam, the one or more lenses including a partially reflective surface to generate and focus a partial reflection of the laser beam, the partially reflective surface comprising either (a) a concave surface facing the laser beam as incident on the transmissive sampling device or (b) a convex surface facing away from the laser beam as incident on the transmissive sampling device, the partially reflective surface being oriented to direct the partial reflection away from the beam path and onto a propagation path to the photodetector, a net-optical power imposed on the laser beam from transmission along the beam path through the one or more lenses being less than 10 diopters in magnitude.

2. The laser apparatus of claim 1, wherein the partially reflective surface spans across a full transverse area of the laser beam and partially reflects the full transverse area of the laser beam.

3. The laser apparatus of claim 1, wherein the partially reflective surface is an uncoated lens surface.

4. The laser apparatus of claim 3, wherein each other lens surface of the one or more lenses, other than the partially reflective surface, includes an antireflective coating.

5. The laser apparatus of claim 1, wherein the transmissive sampling device is a single lens.

6. The laser apparatus of claim 5, wherein the single lens is concave-convex lens.

7. The laser apparatus of claim 1, wherein the partially reflective surface is oriented such that at least an initial propagation path of the partial reflection away from the partially reflective surface is at less than 45 degrees with respect to the beam path.

8. The laser apparatus of claim 1, wherein the propagation path of the partial reflection between the partially reflective surface and the photodetector is straight.

9. The laser apparatus of claim 1, wherein the photodetector is positioned at a focus of the partial reflection.

10. The laser apparatus of claim 1, wherein the transmissive sampling device is positioned in a collimated section of the beam path.

11. A laser apparatus with power monitoring, comprising:
a laser source to generate a laser beam;
a photodetector to monitor a power of the laser beam;
a transmissive sampling device including one or more lenses positioned in a beam path of the laser beam, the one or more lenses including a partially reflective surface to generate and focus a partial reflection of the laser beam, the partially reflective surface being either (a) a concave surface facing the laser beam as incident on the transmissive sampling device or (b) a convex surface facing away from the laser beam as incident on the transmissive sampling device, the partially reflective surface being oriented to direct the partial reflection away from the beam path and onto a propagation path to the photodetector, the one or more lenses imposing a non-zero net-optical power on the laser beam transmitted along the beam path, the non-zero net-optical power being at least 10 diopters in magnitude; and
a focusing element disposed in the beam path after, and adjacent, the transmissive sampling device to modify focusing properties of the laser beam.

12. The laser apparatus of claim 11, wherein the partially reflective surface spans across a full transverse area of the laser beam and partially reflects the full transverse area of the laser beam.

13. The laser apparatus of claim 11, wherein the partially reflective surface is an uncoated lens surface.

14. The laser apparatus of claim 13, wherein each other lens surface of the one or more lenses, other than the partially reflective surface, includes an antireflective coating.

15. The laser apparatus of claim 11, wherein the transmissive sampling device is a single lens.

16. The laser apparatus of claim 15, wherein the single lens is concave-convex lens.

17. The laser apparatus of claim 11, wherein the partially reflective surface is oriented such that at least an initial propagation path of the partial reflection away from the partially reflective surface is at less than 45 degrees with respect to the beam path.

18. The laser apparatus of claim 11, wherein the propagation path of the partial reflection between the partially reflective surface and the photodetector is straight.

19. The laser apparatus of claim 11, wherein the photodetector is positioned at a focus of the partial reflection.

20. The laser apparatus of claim 11, wherein the laser beam is collimated when incident on the transmissive sampling device.

21. The laser apparatus of claim 20, wherein the focusing element is to re-collimate the laser beam after transmission through the transmissive sampling device.

22. The laser apparatus of claim 11, wherein the focusing element is to bring the laser beam to a focus.

* * * * *